United States Patent Office 3,441,111
Patented Apr. 29, 1969

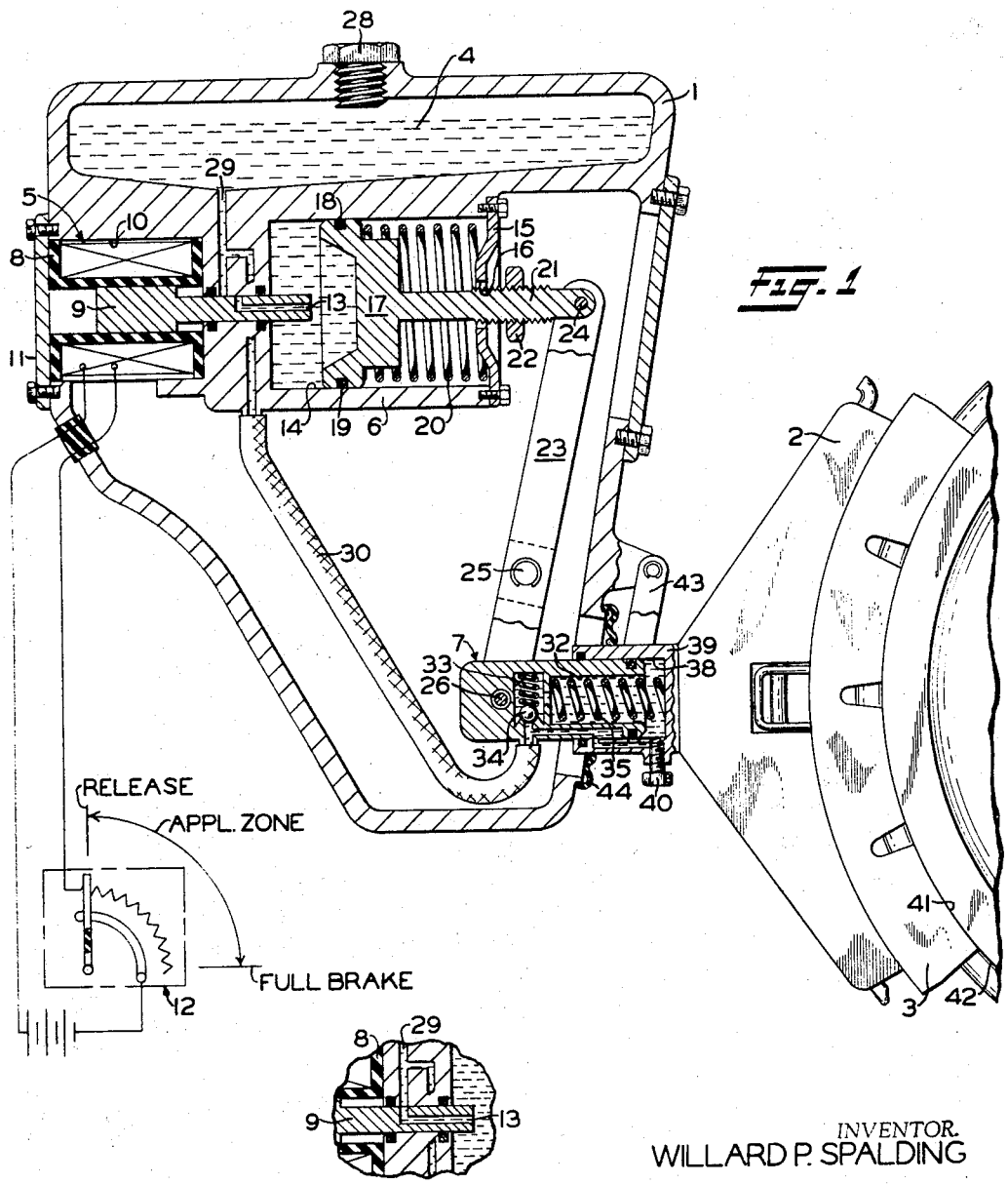

3,441,111
ELECTROHYDRAULICALLY CONTROLLED SPRING APPLIED TREAD BRAKE UNIT
Willard P. Spalding, Verona, Pa., assignor to Westinghouse Air Brake Company, Wilmerding, Pa., a corporation of Pennsylvania
Filed July 26, 1967, Ser. No. 656,189
Int. Cl. F16d 65/24, 65/36; F15b 13/044
U.S. Cl. 188—170        11 Claims

ABSTRACT OF THE DISCLOSURE

A tread brake unit for a railway car wheel comprising a piston subject to opposing forces of hydraulic pressure and a spring for effecting application and release of braking force on a brake shoe, frictionally engaging the tread of the wheel according to differential forces on the piston responsively to deenergization and energization of a solenoid-actuated plunger that shifts into and out of a hydraulic pressure chamber at one side of the piston. The unit includes a hydraulically actuated slack adjuster, interposed between the brake shoe and a brake actuating lever to which the piston is connected, which holds the brake shoe in light pressure contact with the tread of the wheel during brake release to produce heat on the tread surface so that snow and ice will not accumulate on the tread of the wheel.

---

Tread brake units in present use are relatively large in size and many are quite heavy and generally consist of pneumatically actuated units necessitating the use of pneumatic reservoirs, piping systems, and compressors, all of which are bulky, costly and of considerable weight. Moreover, existing tread brake units usually have embodied therein automatic slack adjuster mechanism of a complex mechanical type for maintaining a proper normal clearance between the brake shoe and the tread of the wheel in the brake release position. The slack adjuster units add to the problem of cost and weight and additional problems of installation arise due to space limitations on the car truck.

Recently, tread brake units have found increasing application to cars employed in rapid transit systems where weight and space considerations are important. Therefore, it is the object of the present invention to provide a relatively small, lightweight tread brake unit of the electrohydraulically controlled spring-applied type for eliminating the need for costly pneumatic compressors, reservoirs and piping and also to incorporate a simple light-weight slack adjusting mechanism.

The invention is a tread brake unit comprising a housing in which is formed a cylinder having a piston operable therein subject to the opposing forces of a spring and hydraulic fluid under pressure. The piston is operatively connected to one end of a brake operating lever that is pivotally mounted within the housing, intermediate its ends. The opposite end of the lever is pivotally connected to the cylindrical body of a slack adjuster device carried on the brake head which has a brake shoe thereon for engagement with the tread surface of a car wheel.

The cylindrical body of the slack adjuster device is sealingly slidable in a bore in the brake head and a chamber formed in the body contains a spring which in brake release position of the brake means forces the brake head and shoe normally into light pressure contact with the tread of the wheel. Liquid from a reservoir in the housing is supplied by way of a flexible hose to the chamber within the slack adjuster body. A loaded check valve prevents back flow of hydraulic fluid from the chamber. As wear on the brake shoe occurs, fluid is automatically sucked into the chamber of the cylindrical body upon reduction of the braking force on the brake means to that in effect during brake release.

Hydraulic pressure on the one side of the piston is developed by the pressure exerted on the liquid trapped within the piston chamber by the displacement of a solenoid actuated plunger therein in consequence of energization of the solenoid. The piston is accordingly shifted into operation in opposition to the spring force to actuate, by way of the brake operating lever, the brake shoe to a release position. When the degree of energization of the solenoid is reduced, the hydraulic force on the piston is correspondingly reduced and the spring becomes increasingly effective to exert a force on the brake lever, to apply the brake shoe with increasing braking force to the tread of the wheel.

In the drawing:

FIG. 1 discloses a side elevation view, partially in section, of a tread brake unit embodying the invention.

FIG. 2 is a fragmental view showing the plunger of the solenoid in a brake application position.

Referring to the drawings, the tread brake unit is associated with a car wheel and comprises a housing 1 and braking means including a brake head 2 carrying a brake shoe 3. Within housing 1 there is a sump 4, a solenoid device 5, a hydraulic cylinder 6 and an automatic slack adjuster 7.

The solenoid device 5 comprises a winding 8 and a plunger 9. The solenoid is fitted within a bore 10 in the housing 1 and secured therewithin by cover plate 11. The energization of the winding of the solenoid is controlled by a controller or rheostat 12 in a circuit including an electric power source, such as a storage battery. The solenoid plunger 9 has therein a bore 13 which serves to provide passage for fluid therethrough from the aforementioned sump or reservoir 4 to a piston chamber within hydraulic cylinder 6.

The hydraulic cylinder 6 has a cylindrical bore 14 and a cover plate 15 secured at one end thereof. The cover plate 15 has a central orifice 16 therein. Within said cylindrical bore 14 is a piston 17 having a peripheral groove 18 with an O-ring seal 19 therein. A spring 20 is fitted between the nonpressure face of piston 17 and the cover plate 15 and a piston rod 21 which is integral with said piston 17 extends through orifice 16 of cover plate 15 and is coaxial and concentric with said spring 20. A portion of the piston rod 21 is threaded so as to accommodate an adjustable stop nut 22, larger in diameter than orifice 16 for limiting the outward movement of the piston. The end of piston rod 21 is pivotally connected to one end of a brake actuating H-lever 23 by a pin 24. The H-lever 23 is pivoted about a fulcrum pin 25 which is fixed to the housing 1. The other end of the H-lever is pivotally connected, via pin 26, to a portion of the aforementioned slack adjuster 7 to be described more fully later.

Sump 4 has a filling port at the top of housing 1 closed by a threaded plug 28. Opening into the bottom of sump 4 is a passage 29. Passage 13 in the plunger 9 is adapted to register with the passage 29 to communicate a supply of hydraulic fluid from sump 4 to a pressure chamber at one side of piston 17. Passage 29 also has a branch which is connected to the slack adjuster 7 by way of flexible hose 30.

The slack adjuster 7 comprises a cylinder having a bore 32 therein with a centrally located aperture in a wall that closes the bottom of the bore. Said aperture communicates with a chamber 33 which houses a one-way ball type check valve 34.

Within bore 32 and abutting the said wall, concentric to the axis of said aperture, is a coil spring 35. The closed end of the cylinder is pivotally connected to the other end of H-lever 23 by pin 26.

The open bore end of the cylinder is fitted within the bottom bore 38 of a cylinder 39 which is formed in or attached to the heel of brake head 2. The coil spring 35 which has one end abutting the said wall has its other end abutting the bottom of bottom bore 38, thereby exerting a light pressure on the brake head pressing the brake shoe 2 into frictional contact with the tread surface of the car wheel.

Hydraulic fluid trapped in the slack adjuster by one-way check valve 34 can be returned to the sump by opening a screw valve 40 permitting the hydraulic fluid to bypass the check valve and return to the sump by way of flexible hose 30.

The brake head and shoe are pivotally suspended from the casing 1 by an H-link 43. A sealing boot 44 interposed between the cylinder 39 and the casing 1 serves to prevent entry of dirt into the interior of the casing.

Assume that sump 4 is filled with hydraulic fluid and that cylindrical bore 14, passage 29, flexible hose 30, bore 32, chamber 33 are also filled with hydraulic fluid and that the friction face of the brake shoe 2 is in normal light pressure contact with the tread 42 of the wheel. Further assume that the controller 12 is in its brake release position as shown in FIG. 1 of the drawings and it is desired to make brake application. Upon actuation of the controller 12 from a release position, in which it is shown in FIG. 1, to a full brake position at the other end of the application zone the resistance in the controller increases, thus reducing the current energizing the winding of the solenoid 5, and reducing the hydraulic pressure on piston 17 maintaining it in its brake release position. Spring 20 will now exert a force tending to move piston 17 in the left-hand direction due to the reduced hydraulic pressure within the cylindrical bore 14. The back pressure exerted on plunger 9 moves it to its brake application position, in which it is shown in FIG. 2 of the drawings, so that communication between sump 4 and cylindrical bore 14, via passages 29 and 13 is reestablished, at which time the hydraulic pressure in the piston chamber is reduced to a minimum. As the piston 17 is moved under the force of spring 20, H-lever 23 pivots about its fulcrum 25 exerting pressure on the cylinder of slack adjutser 7 forcing it tighter into bore 38 of cylinder 39. Since ball check valve 34 traps hydraulic liquid in the bores 32 and 38, the incompressible liquid forms a solid link for transmitting the full force exerted by brake lever 23 on the brake shoe, causing it to be applied with full braking force to the tread 42 of the wheel.

Intermediate degrees of brake application can be achieved by moving the handle of the controller 12 to a position anywhere in the application zone between release and full brake positions. This will vary the current energizing the winding of the solenoid device, which in turn will vary the pressure that plunger 9 exerts on the liquid in the piston chamber. This pressure variation will either cause the force of spring 20 to be proportionately overcome causing the pressure on the brake head to be reduced slightly or the pressure on the spring will be reduced allowing the spring to expand slightly which in turn will cause the pressure on the brake head to be increased in an application direction. Some pressure, however, will remain in the bore 14 since the passage 13 in plunger 9 only communicates with passage 29 and sump 4 when the system is in full brake position as shown in FIG. 2 of the drawing.

If it is desired that the unit be placed in brake release position, the controller 12 is actuated from anywhere in the brake application zone to its brake release position. The consequent energization of solenoid winding 8 with maximum current will cause plunger 9 to move within winding 8 from its position in which it is shown in FIG. 2 to the position in which it is shown in FIG. 1, extending the plunger into cylindrical bore 14 and displacing fluid therein. The hydraulic pressure thus acting on piston 17 overcomes the force of spring 20, thereby pivoting lever 23 about its fulcrum 25 and thus relaxing the force exerted through the slack adjuster on said brake head and shoe. The friction face of the brake shoe 3 will remain in light pressure contact, however, with the tread 42 of the wheel, due to the force exerted on the brake head 2 by the spring 35.

During a brake application or when the brake shoe is in light contact with the tread of the wheel, attrition of the tread abutting surface 41 of brake shoe 3 occurs. This attrition is automatically compensated for by slack adjuster 7.

When the system is put into a release position, as previously described, the H-lever 23 moves the cylinder of the slack adjuster 7 away from the tread 42 of the wheel. At the same time spring 35 holds the brake shoe surface 41 against the tread 42 of the wheel so that the distance between the wall at one end of bore 32 and the bottom of bottom bore 38 increases by the amount the brake shoe wore away during the preceding brake application.

As cylinder 39 and slack adjuster 7 moves slightly apart during the brake release, sump fed hydraulic fluid from flexible connector 30 is sucked past check valve 34 into the chamber 33 and bore 32 automatically compensating for the distance the slack adjuster 7 has moved away from cylinder 39.

If it is desired to replace brake shoe 3, the hydraulic fluid within bore 32 and chamber 33 can be returned to sump 4 in bypass of spring-loaded ball check valve 34 by loosening the screw valve 40 from its seat thus establishing communication, via hose 30, to the sump 4. To move the shoe away from the face of the wheel, a conventional type crowbar or other lever means may be applied between the brake head and the wheel to force the brake shoe away from the wheel to enable removal and reinstallation of a new brake shoe.

Having now described the invention, what I claim as new and desire to secure by Letters Patent is:

1. A tread brake unit for a railway car wheel, comprising:
    (a) a cylinder,
    (b) a piston means operable in said cylinder and forming with said cylinder a hydraulic chamber at one side thereof, said piston being subject in opposing relation to hydraulic pressure in said chamber and to the force of spring means,
    (c) a braking means actuated in a braking direction with a force corresponding to the relation between the hydraulic pressure and the force of the spring means, and
    (d) a solenoid device having a plunger for exerting a displacing pressure on the liquid in said hydraulic chamber varying with the degree of energization thereof.

2. The tread brake unit as claimed in claim 1, wherein means is provided for remotely controlling the said solenoid device to effect application and release of said braking means.

3. The apparatus of claim 1 having a sump means from which hydraulic fluid is communicated to said chamber by way of a passage in said plunger and is trapped in said chamber by the movement of said plunger.

4. The apparatus of claim 1 wherein said braking means includes:
    (a) lever means operably connected to said piston means,
    (b) cylinder means, having a bottom bore in one end thereof, operatively connected to said lever means and adapted to transmit force from said lever means in a braking direction,
    (c) brake shoe means having a bottom bore into which the said one end of said cylinder means slidably extends in sealed relation,
    (d) the bores in said cylinder means and brake shoe containing hydraulic fluid trapped therein for transmitting the force imparted by said cylinder means through the hydraulic fluid to said brake shoe means in a braking direction.

5. The apparatus of claim 4 wherein said cylinder means further includes:
 (a) a one-way check valve permitting fluid to enter said bottom bore of said cylinder means and said bottom bore of said brake shoe means and preventing reverse flow of fluid therefrom, and
 (b) another valve means adapted to permit fluid to escape, in bypass said check valve, from said bottom bore of said cylinder means and said bottom bore of said brake shoe means.

6. In a spring-actuated tread brake unit for a car wheel:
 (a) a brake shoe for frictionally applying a braking force to the wheel,
 (b) hydraulic cylinder means comprising a piston means, said hydraulic cylinder means having a chamber at one end thereof in which hydraulic fluid is stored,
 (c) sump means containing hydraulic fluid from which a portion of said fluid is communicated to said chamber,
 (d) means operatively connected to said piston means for transmitting a force to said brake shoe,
 (e) spring means within said cylinder means adapted to transmit force through said means to said brake shoe in a braking direction, and
 (f) plunger means part of which projects into said chamber for exerting a force on hydraulic fluid in the chamber and for controlling the communication of fluid from said sump means to said chamber, thereby providing a force on said piston, opposing the force of said spring means.

7. The apparatus of claim 6 further comprising control means for varying the degree of movement of part of said plunger means within said chamber.

8. The apparatus of claim 7 wherein said control means is an electromagnet means.

9. The apparatus of claim 6 wherein said means operatively connected to said piston means includes:
 (a) lever means operably connected to said piston means,
 (b) cylinder means, having a bottom bore in one end thereof, operatively connected to said lever means and adapted to transmit force from said lever means in a braking direction,
 (c) brake shoe means having a bottom bore into which the said one end of said cylinder means slidably extends in sealed relation, thereby forming with the bore in said cylinder means, an expandable chamber,
 (d) conduit means via which hydraulic fluid is communicated from said sump means to said expandable chamber, whereby force imparted by said cylinder means is transmitted through the hydraulic fluid in said expandable chamber to said brake shoe means in a braking direction.

10. The apparatus of claim 9, further including:
 (a) a check valve permitting fluid from said sump means to enter said expandable chamber means and preventing fluid from leaving said expandable chamber means and returning to said sump,
 (b) another valve means adapted to permit fluid to bypass said check valve and to leave said expandable chamber means and return to said sump, and
 (c) another spring means within said expandable chamber means adapted to apply a force within said chamber on said brake head means in a braking direction when said spring means is not effectively transmitting a braking force in a braking direction.

11. The apparatus of claim 9, wherein expansion of said expandable chamber on wear of the brake shoe means causes hydraulic fluid to be drawn by suction from the sump means to the expandable chamber to maintain an incompressible hydraulic link therein.

References Cited
UNITED STATES PATENTS

| 2,350,636 | 6/1944 | Piron | 188—156 X |
| 3,181,665 | 5/1965 | Trombetta | 188—170 X |

DUANE A. REGER, *Primary Examiner.*

U.S. Cl. X.R.
91—459; 188—156